United States Patent
Rowe et al.

(10) Patent No.: US 9,436,483 B2
(45) Date of Patent: Sep. 6, 2016

(54) ENHANCED SYSTEM AND METHOD FOR DYNAMICALLY CONNECTING VIRTUAL SPACE ENTITIES

(71) Applicant: Disney Enterprises, Inc., Burbank, CA (US)

(72) Inventors: James Rowe, Herriman, UT (US); Justin Towns, Draper, UT (US); Chad Liddell, Taylorsville, UT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 475 days.

(21) Appl. No.: 13/869,865

(22) Filed: Apr. 24, 2013

(65) Prior Publication Data
US 2014/0325406 A1  Oct. 30, 2014

(51) Int. Cl.
*G06F 3/048*  (2013.01)
*G06F 9/44*  (2006.01)
*G06F 3/0484*  (2013.01)
*G06F 3/0481*  (2013.01)

(52) U.S. Cl.
CPC .......... *G06F 9/4443* (2013.01); *G06F 3/0484* (2013.01); *G06F 3/04817* (2013.01)

(58) Field of Classification Search
CPC . G06F 3/0484; G06F 9/4443; G06F 3/04817
USPC ........................................................ 715/765
See application file for complete search history.

(56) References Cited

U.S. PATENT DOCUMENTS

| | | | |
|---|---|---|---|
| 5,498,002 A * | 3/1996 | Gechter | 463/31 |
| 6,219,045 B1 | 4/2001 | Leahy et al. | 345/331 |
| 7,244,181 B2 | 7/2007 | Wang et al. | 463/42 |
| 8,721,443 B2 | 5/2014 | Crocker | 463/36 |
| 2002/0165993 A1* | 11/2002 | Kramer | 709/315 |
| 2003/0177187 A1 | 9/2003 | Levine et al. | 709/205 |
| 2004/0143852 A1 | 7/2004 | Meyers | 725/133 |
| 2004/0153557 A1 | 8/2004 | Shochet et al. | 709/229 |
| 2004/0175680 A1 | 9/2004 | Hlavac et al. | 434/236 |
| 2004/0235564 A1 | 11/2004 | Booth | 463/31 |
| 2006/0100018 A1 | 5/2006 | Ganz | 463/42 |

(Continued)

OTHER PUBLICATIONS

"Trigger animations in PowerPoint 2010", by Geetesh Bajaj, published May 25, 2012, taken from https://support.office.com, pp. 1-6.*

(Continued)

*Primary Examiner* — William Bashore
*Assistant Examiner* — Gregory A Distefano
(74) *Attorney, Agent, or Firm* — Sheppard Mullin Richter & Hampton LLP (57) ABSTRACT

A system and method for connecting virtual space entities are disclosed. Information regarding virtual space entities may be obtained. The obtained information may include information indicating one or more actions and/or effects associated with the virtual space entities. The associated effects may indicate the associated actions may be caused in the virtual space by actions of other virtual space entities. Users may be enabled to specify action connections between actions of different virtual space entities. The user specified action connections may provide causal relationships between a first action and a first effect associated with a second action. Occurrence of the first action within a given instance of virtual space may be determined. Based on the user specified action connections, the first effect may be executed to cause the second action to be performed in the virtual space.

22 Claims, 7 Drawing Sheets

(56) References Cited

U.S. PATENT DOCUMENTS

| | | | |
|---|---|---|---|
| 2006/0148545 A1 | 7/2006 | Rhyne, IV et al. | 463/1 |
| 2008/0052140 A1* | 2/2008 | Neal et al. | 705/7 |
| 2010/0134501 A1* | 6/2010 | Lowe | G06T 13/40 345/474 |
| 2010/0269090 A1* | 10/2010 | Le Merrer | 717/105 |
| 2013/0120405 A1* | 5/2013 | Maloney | G06T 13/00 345/474 |

OTHER PUBLICATIONS

Of "Trigger Happy Animations in PowerPoint", published Jan. 13, 2004, taken from http://www.onppt.com/ppt, pp. 1-8.*

* cited by examiner

ENHANCED SYSTEM AND METHOD FOR DYNAMICALLY CONNECTING VIRTUAL SPACE ENTITIES

FIELD OF THE DISCLOSURE

This disclosure relates to facilitating users to dynamically connecting virtual space entities present in an instance of the virtual space.

BACKGROUND

In conventional virtual space systems, interactions between virtual space objects and/or characters are typically defined by providers of the virtual space systems. In those systems, such interactions are typically programmed at configuration stages of the systems, e.g., during a development of virtual space software. For example, a ball may be programmed to roll in the virtual space in response to physical force applied by a character's kicking. In those systems, reconfigurations of such interactions are often tedious and time consuming. Typically, to introduce new or modify existing interactions between virtual space objects and/or characters, providers of the virtual space systems will need to reprogram the virtual space systems, which usually involves recompiling and re-releasing virtual space software. Moreover, in those systems, the users do not have controls on how the game characters and/or objects should interact with one another at runtime of the virtual space system.

SUMMARY

One aspect of the disclosure relates to facilitating users to dynamically specify action connections between virtual space entities and executing actions in the virtual space based on the user specified action connections. The users may be enabled to specify such action connections in an instance of the virtual space, e.g., through a user interface. At runtime of the virtual space system, occurrence of the actions specified in the action connections may be detected. Effects of the detected actions may be executed in the virtual space to cause other actions to be executed in the virtual space, as specified by the action connections. Accordingly, users may be enabled to dynamically define and initiate interactions between virtual space entities at runtime of the virtual space system. This allows the users to customize interactions between virtual space entities without having the virtual space system reconfigured as required by the conventional virtual space systems.

In some implementations, a system configured to connect virtual space entities may include a server. The server may operate in a client/server architecture with one or more client computing platforms. The client computing platforms may be associated with the users of the virtual space. The server may be configured to execute one or more of a virtual space entity module, a connection module, a connection interface module, an effect module, and/or other modules.

The virtual space entity module may be configured to register information regarding individual entities present in a given instance of the virtual space. In some implementations, for such registrations, the virtual space entity module may be configured to monitor virtual space and detect presence of virtual space entities in the given instance of the virtual space. The registered information regarding the virtual space entities may include information indicating actions, effects and/or other information associated with the virtual space entities. Actions associated with virtual space entities may be programmed at a configuration stage of the virtual space system by provider, administrator, moderator, and/or any other entities related to the virtual space. As used herein, the term "action" may refer to something done or performed by, to, or on a virtual space entity within the virtual space. An action may be reflected in a change between states, an event, and/or other phenomena. An action may be active (e.g., performed by the virtual space entity), passive (e.g., performed on the virtual space entity), and/or some combination of active and passive. An effect associated with a virtual space entity may indicate causation such that the execution of the effect may cause the virtual space entity to perform an action associated with the virtual space entity. Such effect may be produced by one or more actions performed by other virtual space entities.

The connection module may be configured to obtain user specified action connections between virtual space entities and to register the obtained user specified action connections. The obtained action connections may provide causal relationships between actions associated with individual virtual space entities. An action connection may provide a causal relationship between a first action associated with a first virtual space entity and a first effect associated with a second virtual space entity. In some examples, to provide such a causal relationship, the user specified action connection may establish a link between the first action and the first effect. As such, the action connection may indicate that upon occurrence of the first action by the first virtual space entity, the first effect may be executed to cause the second virtual space entity to perform an action.

The connection interface module may be configured to generate user interfaces that facilitate the users to specify action connections in the virtual space. Such user interfaces may be presented to the user on an electronic display associated with the computing platform. In some implementations, the connection interface module may be configured to generate a user interface based on user selection of a virtual space entity. In some implementations, the connection interface module may be configured to determine whether a user selected action can be connected with another action in the virtual space also selected by the user. In some implementations, the connection interface module may be configured to determine that a user selected action may not be connected with another user selected action and generate information in the user interface to indicate so.

The effect module may be configured to generate commands for effects specified in the user specified action connections to be executed in the virtual space. For generating such commands, the effect module 114 may be configured to receive information indicating one or more actions have occurred in the virtual space. Responsive to receiving such information, the effect module may be configured to compare the actions indicated by the received information with actions specified in the action connections. Responsive to detections of occurrences of action specified in the action connections, the effect module may be configured to generate commands for the effects of the detected actions to be executed in the virtual space, as indicated by the action connections. In some implementations, the effect module may be configured to detect occurrences and execute such effects recursively. In some implementations, for such recursive detection and execution of effects, the effect module may be configured to monitor actions caused by detected action in a given instance of the virtual space, determine whether these caused actions may produce effects to cause other actions in the instance of the virtual space as specified in the action connections, execute the effects of these caused action if any and repeat this detection, determination and execution of effects until there is no more effect detected to cause an action to be executed in the given instance of the virtual space as specified in the action connections. In this fashion, the effect module may effectuate a chain of action causations as a result of occurrence of one or more actions detected in the instance of the virtual space. In some implementations, the effect module may be configured to effectuate transmission of the generated commands to a virtual space server for execution of the effects by a space module provided by the virtual space server.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
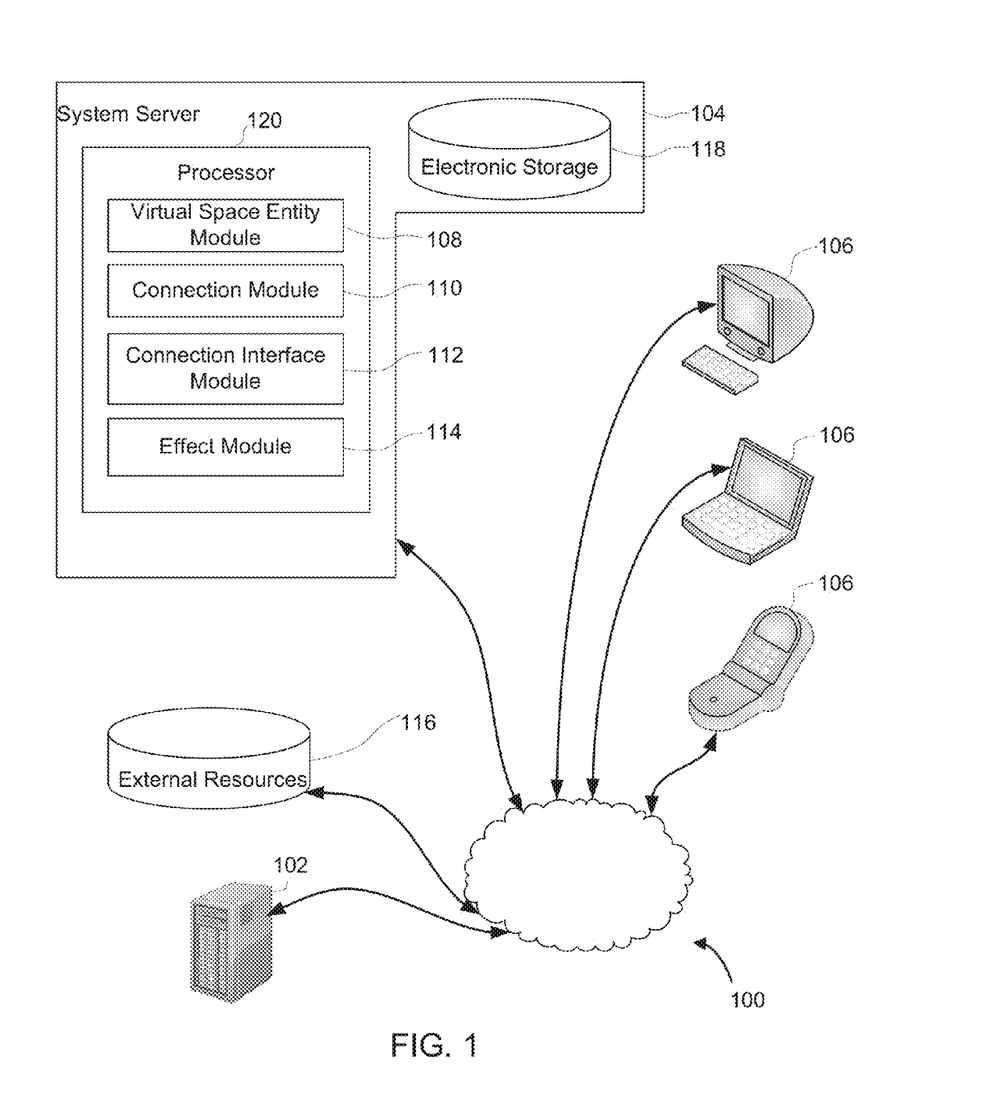
FIG. 1 illustrates one example of a system configured to connect virtual space entities in accordance with one embodiment of the disclosure.

FIG. 1 illustrates one example of a system 100 that is configured to connect virtual space entities in accordance with one embodiment of the disclosure. The virtual space entities may be configured to perform actions in the virtual space. Action connections between different virtual space entities may be specified by users. The user specified action connections may provide causal relationships in the virtual space such that occurrence of an action in the virtual space will produce an effect to cause a corresponding action to be executed in the virtual space. User interfaces may be provided to enable users to specify such action connections. As so enabled, the users may dynamically define and initiate interactions between virtual space entities at runtime of the virtual space system. This may enhance user experience with the virtual space as the users are facilitated to control how the virtual space entities should interact with one another.

In some implementations, system 100 may include one or more of one or more virtual space servers 102, one or more system servers 104, and/or other components. The virtual space server 102 may be configured to communicate with one or more client computing platforms 106 according to a client/server architecture to provide the virtual space to users via the client computing platforms 106. The system server 104 may be configured to interface with virtual space server 102 to supplement the functionality provided to the users with respect to the virtual space. For example, system server 104 may interface with virtual space server 102 via one or more application programming interfaces.

The system server 104 may be configured to execute one or more computer program modules. The computer program modules may include one or more of a virtual space entity module 108, a connection module 110, a connection interface module 112, an effect module 114, and/or other modules.

The virtual space entity module 108 may be configured to register information regarding individual entities present in an instance of a virtual space, which may be, for example, implemented by a space module provided by the virtual space server 102. The instance of the virtual space may reflect a state of the virtual space. The space module provided by the virtual space sever 102 may determine state information for the instance of the virtual space. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

The instance of the virtual space may comprise a simulated space that is accessible by users via clients (e.g., client computing platforms 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module, users may control, customize and/or interact with virtual space entities, such as but not limited to, characters, objects, simulated physical phenomena (e.g., wind, rain, earthquakes, and/or other phenomena), and/or other virtual space entities within the virtual space. The virtual space entity(s) may move through and interact with other virtual space entities (e.g., non-user characters in the virtual space, other objects in the virtual space). The virtual space entity(s) controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by inputting commands through client computing platforms 106. The commands may specify virtual space maneuvers and/or other user interactions with the virtual space. The user specified virtual space maneuvers may direct one or more virtual space entities to perform actions and interact with one another in the virtual space. The commands may be executed in the virtual space such that user specified virtual space maneuvers may be effectuated in the virtual space.

To facilitate such virtual space maneuvers requested by the users, the provider, administrator, moderator, and/or any other entities related to the virtual space may configure individual virtual space entities with programming rules representing actions at a programming stage of the system 100. As used herein, the term "action" may refer to something done or performed by, to, or on a virtual space entity within the virtual space. An action may be reflected in a change between states, an event, and/or other phenomena. An action may be active (e.g., performed by the virtual space entity), passive (e.g., performed on the virtual space entity), and/or some combination of active and passive. By way of non-limiting examples, a pressure plate may be configured with programming rules representing two actions the pressure plate may perform in the virtual space: pressing downwards, or releasing upwards; a cannon may be configured to perform one of three actions in the virtual space: launching confetti, launching fireworks, or launching both confetti and fireworks; and so on.

A programmed action may produce one or more effects in the virtual space. The produced effects may be associated with individual virtual space entities. An individual virtual space entity may be configured to be associated with one or more effects that cause the virtual space entity to perform an action associated with the virtual space entity. As used herein, such an effect will be referenced as a causal effect, which causes an action to be executed in the virtual space. For example, the cannon may be configured to be associated with a causal effect that causes the cannon to launch fireworks. Other causal effects associated with the cannon may include an effect that causes the cannon to launch confetti and an effect that causes the cannon to launch both the confetti and fireworks.

In some implementations, the virtual space entity module 108 may be configured to monitor the virtual space and detect presence of virtual space entities in a given instance of the virtual space. For example, the virtual space entity module 108 may be configured to obtain state information from the virtual space sever 102, e.g., via the space module, and detect presence of one or more virtual space entities in a given instance of the virtual space. For example, a user may place a cannon in a location within the virtual space (e.g., the user selects a cannon from a palette and drops the cannon onto the virtual space location) in a given instance of the virtual space. In that example, the virtual space entity module 108 detects the presence of the cannon in the instance of the virtual space by determining that the obtained state information about the virtual space indicating that the cannon is present in the virtual space at that instance.

In those implementations, responsive to the detection that one or more virtual space entities are present in a given instance of the virtual space, the virtual space entity module 108 may be configured to register information regarding those virtual space entities, e.g., in the electronic storage 118. In some implementations, such information may be registered in a file and/or database stored in the electronic storage 118. Such a file and/or the database may be accessed by other modules, e.g., such as the connection interface module 112 of system 100 via any suitable communication means. In some implementations, such information may be registered in memory storage provided by the electronic storage 118 fast access by other modules of the system 100.

In any case, the registered information may include information indicating actions and/or effects (i.e. the causal effects) associated with the virtual space entities present in the instance of the virtual space. For example, in a case where it is determined that a cannon and a pressure plate are present in the instance of the virtual space, the virtual space entity module 108 may register information regarding the actions and/or effects associated with the cannon and the pressure plate. For the cannon, the registered information may include information indicating that the cannon is configured to perform one of three actions: i.e., launching confetti, launching fireworks, or launching both the confetti and fireworks and indicating that three causal effects are associated with the cannon: i.e., to launch confetti, to launch fireworks, or to launch both the confetti and fireworks. For the pressure plate, the registered information may include information indicating the pressure plate is configured to perform one of two actions: i.e., pressing downwards, or releasing upwards, and indicating that two causal effects are associated with the pressure plate: i.e., to be stepped on or to be stepped off.

It should be appreciated that the number of actions and/or effects associated with an individual virtual space entity may vary in some other examples. Particularly, in some examples, it may be desired not to associate a effect with an individual virtual space entity such that the action(s) of the individual virtual space entity may not be caused by other virtual space actions dynamically. However, in those examples, such an individual virtual space entity may be configured to perform actions that produce causal effects that may cause other virtual space entities to perform their actions in the virtual space. For example, a effect may not be associated with the pressure plate to cause the pressure plate to press downwards or release upwards dynamically in the virtual space (e.g., these actions of the pressure plate may be instigated automatically according to a script predetermined by provider, administrator, moderator, and/or any other entities related to the virtual space). However, the actions of the pressure plate may be configured to produce causal effects to cause other virtual space entities to perform their actions in the virtual space (e.g., downward pressing of the pressure plate may cause the cannon to launch fireworks).

Connection module 110 may be configured to obtain user specified action connections between virtual space entities and to register the obtained user specified action connections. In some implementations, the obtained user specified action connections may be registered by the connection module 110 in a file and/or database stored in the electronic storage 118 and the file and/or the database may be accessed by other modules, e.g., such as the effect module 114 of system 100 via any suitable communication means. In some implementations, such user specified action connections may be registered by the connection module 110 in memory storage provided by the electronic storage 118 for fast access by other modules of the system 100.

In any case, the obtained user specified action connections may provide causal relationships between actions associated with individual virtual space entities. In some examples, an action connection may provide a causal relationship between a first action associated with a first virtual space entity and a first effect associated with a second virtual space entity. To provide such a causal relationship in the virtual space, the user specified action connection may establish a link between the first action and the first effect, i.e. a causal effect.

By way of a non-limiting example, an action connection between the cannon and pressure plate may be specified by a user and registered. The user specified action connection may provide a causal relationship between a launching action of the cannon and the downward pressing action of the pressure plate. For such a causal relationship, the user may specify in the action connection that the downward pressing action of the pressure plate may produce a causal effect to cause the cannon to launch fireworks. Simultaneously or alternatively, other user specified action connections may be obtained: for example the cannon may also be connected with a pulley to launch fireworks when the pulley pulls backwards; the cannon may be connected with a lever to fire confetti when the lever rotates; and so on. It should be appreciated that the first action of the first virtual space entity (e.g., launching fireworks by the cannon) may be connected with one or more actions by other virtual space entities in multiple action connections (i.e., the downward pressing by the pressure plate, the pulling back by the pulley, and so on may all produce the causal effect to cause the cannon to launch the fireworks). FIGS. 2A-H will illustrate further details about the user specified action connections.

Connection interface module 112 may be configured to generate interfaces to facilitate users to specify action connections in the virtual space. The user interfaces generated by connection interface module 112 may be presented to the user through electronic displays coupled to or included in the client computing platforms 106. The generated user interfaces may include one or more control fields. A control field may be configured to receive inputs indicating an entry and/or selection of virtual space entity present in an instance of the virtual space. Inputs may be made to the generated user interface separate from any control field. Through the inputs, the user may select a first virtual space entity; select a first action associated with the first virtual space entity; select a second virtual space entity; select a first effect, i.e. a causal effect associated with the second virtual space entity; and connect the first action with the second action by linking the first action with the first effect.

In some implementations, the connection interface module 112 may be configured to generate a user interface based on user selection of a virtual space entity. For such generations, the connection interface module 112 may be configured to determine, e.g., from the registered information regarding a user selected virtual space entity, one or more actions associated with the user selected virtual space entity. Information (graphical, audio, and/or textual) may be generated in the user interface by the connection interface module 112 to present these actions to the users. User input of a selected action may be received by the connection interface module 112 and based on the selected action, one or more virtual space entities, present in the instant virtual space, whose actions may be connected with the user selected action may be determined. Information (graphical, audio, and/or textual) may be generated in the user interface by the connection interface module 112 to present these virtual space entities to the users. User input of a second selected virtual space entity to be connected with the selected action may be received by the connection interface module 112 from the user and information indicating actions associated with the second selected virtual space entity may be generated in the user interface by the connection interface module 112. User input of a second selected action may be received and an action connection between the first action and a causal effect that causes the second action by the second virtual space may be established and registered.

In some implementations, the connection interface module 112 may be configured to determine whether a user selected action can be connected with another user selected action to form a causal relationship in the virtual space. For example, inputs of a user selection of a first action associated with a first virtual space entity and a second action associated with a second virtual space entity may be received from a user interface generated by the connection interface module 112. The selections may be made by the user through the user interface to specify an action connection between the first action and second action such that the occurrence of the first action will produce a causal effect to cause the second action to be performed by the second virtual space entity. Before sending this user specified action connection to connection module 110 for a registration, the connection interface module 112 may be configured to verify whether such an action connection can be established in the virtual space. In some examples, the verifications may be done by consulting predetermined virtual space rules. In those examples, the predetermined virtual space rules may specify virtual space logic, gameplay, mechanics and/or other rules that dictate interactions between virtual space entities. For instance, the virtual space rules may specify criteria for the cannon to be caused to launch fireworks: e.g., the cannon may only be set off by a translational motion performed by a virtual space object. Based on such criteria, the connection interface module 112 may determine that a user selected downward pressing action by a pressure plate present in a given instance of the virtual space may be connected with the fireworks launching action by the cannon.

In some implementations, the connection interface module 112 may be configured to determine that a user selected action may not be connected with another action in the virtual space and generate information in the user interface to indicate so. For example, a user may select a rolling action by a roller and the fireworks launching action in the user interface, attempting to connect the two actions. The connection interface module 112 may determine, e.g., based on the predetermined virtual space rules, that the rolling action may not be connected with the firework launching action because the predetermined virtual space rules require the causal effect to cause the firework launching action by the cannon to be produced by a virtual space entity with translational motion not rotational motion.

The effect module 114 may be configured to generate commands for effects as indicated by the user specified action connections to be executed in the virtual space. For generating such commands, the effect module 114 may be configured to receive information indicating one or more actions that have occurred in the virtual space. In some implementations, the effect module 114 may be configured to receive state information determined by the space module provided by the virtual space server 102 for the instant virtual space. The received state information may include information indicating one or more state changes representing occurrences of actions within the instance of the virtual space. For example, the state information for an instance of the virtual space may indicate that the pressure plate has performed a downward pressing action (e.g., as indicated by the position change of pressure plate) in the instance of the virtual space. In those implementations, the effect module 114 may be configured to receive the state information as the state information is pushed to the effect module at a given instance of the virtual space, e.g., by the virtual space server 102, via the space module.

Responsive to receiving the information indicating actions within a given instance of the virtual space, the effect module 114 may be configured to compare the actions indicated by the received information with actions in the user specified action connections registered by the connection module 110, and to detect occurrences of actions that produces causal effects specified in the action connections. The comparison may be made by matching the actions in the received information with the actions specified in the action connections. In some embodiments, this may be done through string matching. Upon a match, the effect module 114 may detect that an occurrence of an action specified in the action connection.

Responsive to occurrences of the detected actions, the effect module 114 may be configured to generate commands for causal effects corresponding to the detect actions in the action connections to be executed in the virtual space. In some implementations, the effect module 114 may simply generate a command instructing the space module to execute the corresponding causal effects. Such a command, for example, may be executed by the space module on the virtual space server 102 to effectuate actions caused by the effects in the virtual space.

In some implementations, the effect module 114 may be configured to detect occurrences and execute effects recursively. In those implementations, for such recursive detection and execution of effects, the effect module 114 may be configured to monitor caused actions (i.e., actions that are caused by occurrences of other actions as specified in the action connections) in a given instance of the virtual space and determine whether these caused actions may produce causal effects to cause other actions in the given instance of the virtual space according to the user specified action connections. For example, in the case where the downward pressing action was performed by the pressure plate in a given instance of the virtual space, the effect module 114 determines that this downward pressing action causes the cannon to launch fireworks as indicated by the user specified action connections. Upon such a determination, the effects module 114 may continue to determine whether the fireworks launching action by the cannon may produce causal effect(s) to cause other actions in the given instance of the virtual space, as also indicated by the user specified action connections. If the user specified action connections indicate that the fireworks launching action by the cannon will cause another action in the virtual space, the effect module 114 may generate a command to cause that action to be executed in the virtual space. This recursive determination and execution of causal effects may be repeated by the effect module 114 until there is no more occurrence of causal effect in the given instance of the virtual space.

In some implementations, the effect module 114 may be configured to effectuate the transmission of the generated commands to virtual space server 102 for execution of the effects by the space module. This may involve invoking network transmission module (e.g., a network driver) included in the system server 104 and provide the generated command to the transmission module for transmitting the generated command over the network.

The virtual space server 102, the system server 104, client computing platforms 106, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, 104, client computing platforms 106, and/or external resources 116 may be operatively linked via some other communication media.

A given client computing platform 106 may include one or more processors configured to execute computer program modules. The computer program modules may be configured to enable an expert or user associated with the given client computing platform 106 to interface with system 100 and/or external resources 116, and/or provide other functionality attributed herein to client computing platforms 106. By way of non-limiting example, the given client computing platform 106 may include one or more of a desktop computer, a laptop computer, a handheld computer, a tablet computing platform, a NetBook, a Smartphone, a gaming console, and/or other computing platforms.

External resources 116 may include sources of information, hosts and/or providers of virtual environments outside of system 116, external entities participating with system 100, and/or other resources. In some implementations, some or all of the functionality attributed herein to external resources 118 may be provided by resources included in system 100.

In this example, system server 104 includes electronic storage 118, one or more processors 120, and/or other components. Server 104 may include communication lines, or ports to enable the exchange of information with a network and/or other computing platforms. Illustration of server 104 in FIG. 1 is not intended to be limiting. Server 104 may include a plurality of hardware, software, and/or firmware components operating together to provide the functionality attributed herein to server 104. For example, server 104 may be implemented by a cloud of computing platforms operating together as server 104.

Electronic storage 118 may comprise non-transitory storage media that electronically stores information. The electronic storage media of electronic storage 118 may include one or both of system storage that is provided integrally (i.e., substantially non-removable) with system server 104 and/or removable storage that is removably connectable to server 104 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 104, information received from client computing platforms 106, and/or other information that enables server 104 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, 114, and/or other modules. Processor 120 may be configured to execute modules 106, 108, 110, 112, 114, and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

The virtual space server 102 may also include one or more processors configured to run programs including a space module that executes and implements instances of the virtual space, electronic storage, I/O subsystem, and/or any other components.

It should be appreciated that although modules 108, 110, 112, 114, are illustrated in FIG. 1 as being implemented within a single processing unit, in implementations in which processor 120 includes multiple processing units, one or more of modules 108, 110, 112, 114, may be implemented remotely from the other modules. The description of the functionality provided by the different modules 108, 110, 112, 114, described below is for illustrative purposes, and is not intended to be limiting, as any of modules 108, 110, 112, 114, may provide more or less functionality than is described. For example, one or more of modules 108, 110, 112, 114, may be eliminated, and some or all of its functionality may be provided by other ones of modules 108, 110, 112, 114. As another example, processor 120 may be configured to execute one or more additional modules that may perform some or all of the functionality attributed below to one of modules 108, 110, 112, 114.

It should be appreciated that the above description of system 100 is merely illustrated as one example of a system configured to connect virtual space entities in accordance with the disclosure. It should be appreciated that in some examples, a localized system 100 may be configured according to a stand-alone architecture such that the system configured to connect virtual space entities may be localized. For example, the localized system 100 may comprise a processor the same as or similar to the processor 120, e.g., a CPU, a graphical processing unit (GPU), storage, memory, an I/O subsystem, and/or other components included the localized system 100. In those examples, the CPU 120 may be configured to communicate virtual space state information to the GPU through any suitable wired or wireless communications such as, but not limited to, a point-to-point communication link like a data bus included in the localized system 100. The GPU may be configured to determine representational view information for presenting instances of virtual space on one or more displays coupled to or included in the localized system 100. It should also be appreciated in some other examples, multiple localized systems 100 may be connected via any wired or wireless links according to a distributed architecture (e.g., peer to peer networks) such that the localized systems 100 may be configured to operate collectively to achieve all or some of the functionalities of 108, 110, 112, 114, as described above.

Figure 2A:
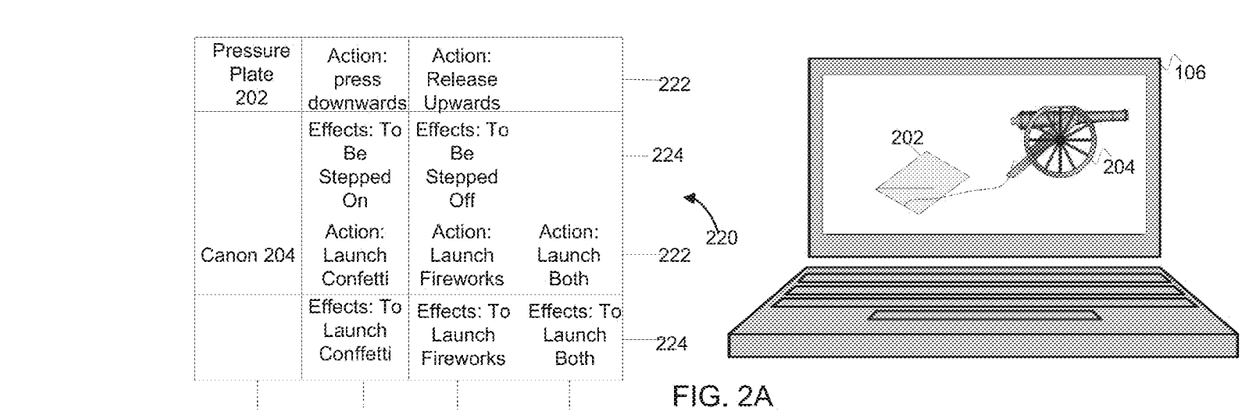
FIG. 2A illustrates an example of registering virtual space entities in accordance with the disclosure.

FIGS. 2A-H illustrate various examples of using system 100 illustrated in FIG. 1 to connect virtual space entities. They will be described with references to FIG. 1. FIG. 2A illustrates at a given instance of a virtual space presented on a client computing platform 106, a pressure plate 202 and a cannon 204 are present in the virtual space. The pressure plate 202 and cannon 204 may be present in the instance of the virtual space because they have been created (e.g., through building, prospecting, wielding, and/or any other virtual space object acquisition method provided by the virtual space system), have been placed, e.g., in an editing mode of the virtual space that enables the user create and/or customize the virtual space, have been generated by the virtual space according to a script predetermined by the provider, administrator, moderator, and/or any other entities related to the virtual space, and/or have been present in the virtual space in any other ways that may make virtual space entities present in the instance of the virtual space.

In any case, in this example, the virtual space entity module 108 may detect the presence of the pressure plate 202 and the cannon 204 in the given instance of the as described above. As shown, responsive to such detections, the virtual space entity module 108 may obtain information 220 regarding the pressure plate 202 and the cannon 204 present in the given instance of the virtual space. As illustrated, the obtained information may include information 222 indicating actions that may be performed by the pressure plate 202 and the cannon 204 in the virtual space, and information 224 indicating causal effects associated with the pressure plate 202 and the cannon 204, and/or any other information regarding the pressure plate 202 and the cannon 204. In this example, two causal effects 224 are associated with the pressure plate 202: i.e. to cause the pressure plate to be stepped on, and to cause the pressure plate to be stepped off. These two causal effects 224 associated with the pressure plate 202 may be linked with the two actions 222 associated with the pressure plate such that when the causal effect 224 to be stepped on occurs in the virtual space, the pressure plate will perform the action of pressing downwards, and when causal effect 224 to be stepped off occurs in the virtual space, the pressure plate will perform the action of releasing upwards. Likewise, three causal effects 224 are associated with the cannon 204, which will cause the three actions 222 associated with the cannon 204 to be performed by the cannon 204 in the virtual space. The obtained action and effect information regarding the pressure plate 202 and the cannon 204 may be registered by the virtual space entity module 108 as described above.

Figure 2B:
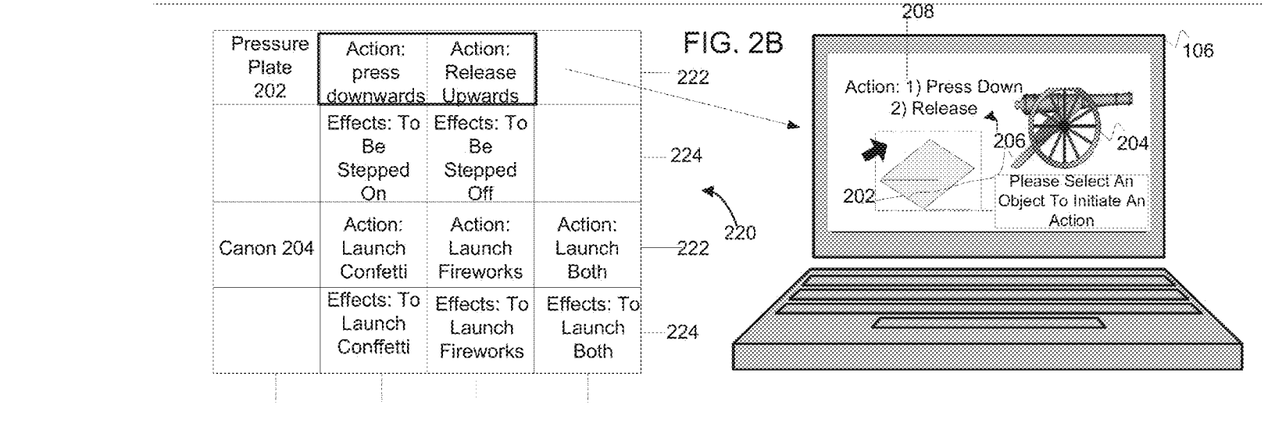
FIG. 2B illustrates an example of selecting a virtual space entity for specifying an action connection in accordance with the disclosure.

FIG. 2B illustrates that the pressure plate is selected by a user through inputs to a user interface 206 generated by the connection interface module 112. In this example, the user interface 206 is generated by the connection interface module 112 to facilitate the user to specify action connections between virtual space entities present in the given instance of the virtual space (e.g., the pressure plate 202 and the cannon 204). As illustrated, the generated user interface 206 may prompt the user to select an object present in the given instance of the virtual space to initiate an action that may cause other objects to perform an action in the virtual space. As shown, in this example, the user selects the pressure plate 202. Responsive to this selection by the user, the connection interface module 112 may consult the registered information 220 regarding actions that may be performed by the pressure plate 202 in the virtual space. As shown, the registered information 220 indicates that pressure plate 202 is configured to perform one of the two actions 222: i.e., pressing downwards or releasing upwards. Responsive to such action indication by the registered information 220, the connection interface module 112 may generate action information 208 in the user interface 206 as illustrated.

Figure 2C:
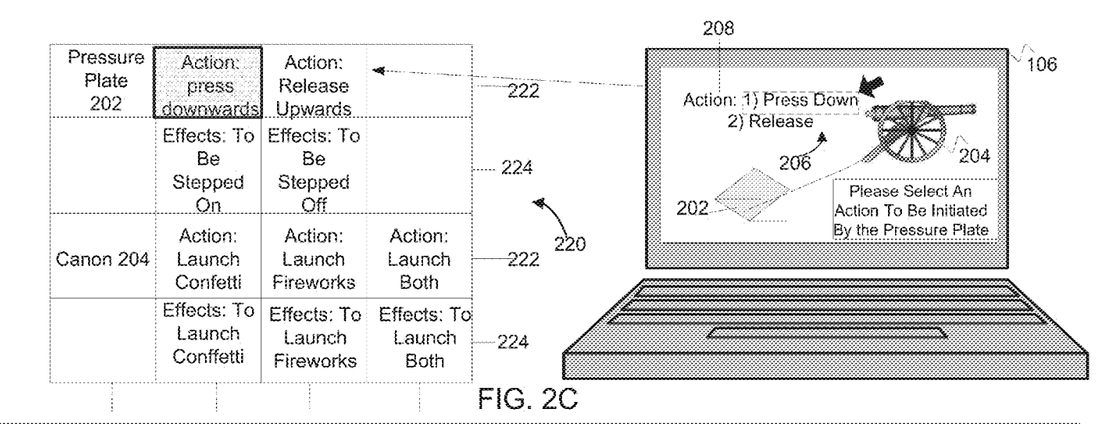
FIG. 2C illustrates an example of selecting an action from the virtual space entity selected in FIG. 2B.

As shown in FIG. 2C, responsive to user's selection of the pressure plate 202, the connection interface module 112 further generates prompts in the user interface 206 to prompt the user to select an action to be initiated by the pressure plate 202. As illustrated, the generated user interface 206 presents action choices 210 based on the registered information 220 regarding the pressure plate 202 to facilitate the user to select an action to be initiated by the pressure plate 202. In this example, as shown, the user selects the downward pressing action 222.

Figure 2D:
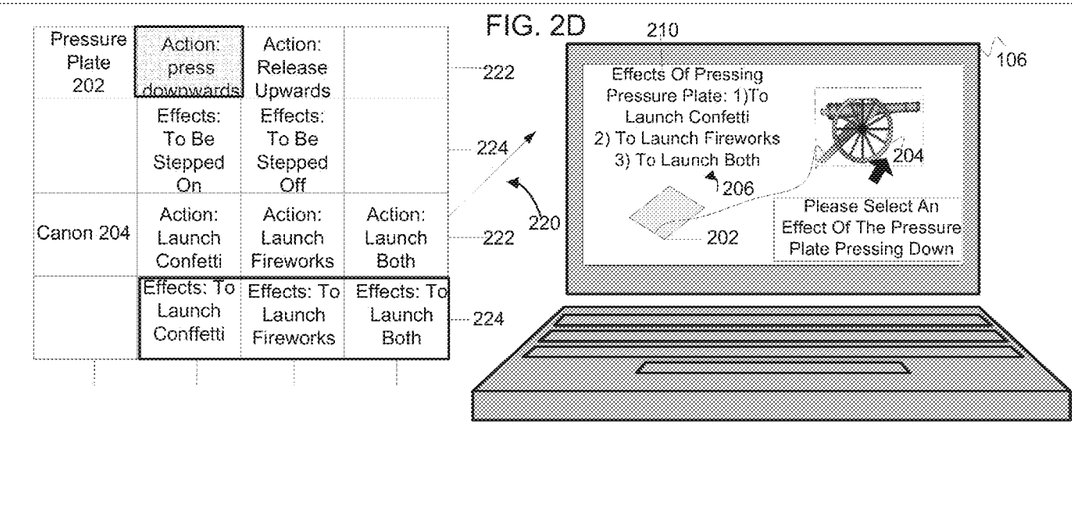
FIG. 2D illustrates an example of selecting a virtual space entity whose action is to be connected to the action selected in FIG. 2C in the action connection.

FIG. 2D illustrates that responsive to user selection of the downward pressing action 222 by the pressure plate 202, the connection interface module 112 further generates information in the generated user interface 206 to prompt the user to select an effect of the pressure plate pressing down. In this example, the user selects the cannon 204 to be the effect of the downward pressing action 222 by the pressure plate 202. Responsive to such a selection, the connection interface module 112 generates effects choices 210 that are associated with the cannon 204 based on the registered information 220 regarding the cannon 204, and presents the generated effect choices 210 in the user interface 206 to the user as illustrated.

Figure 2E:
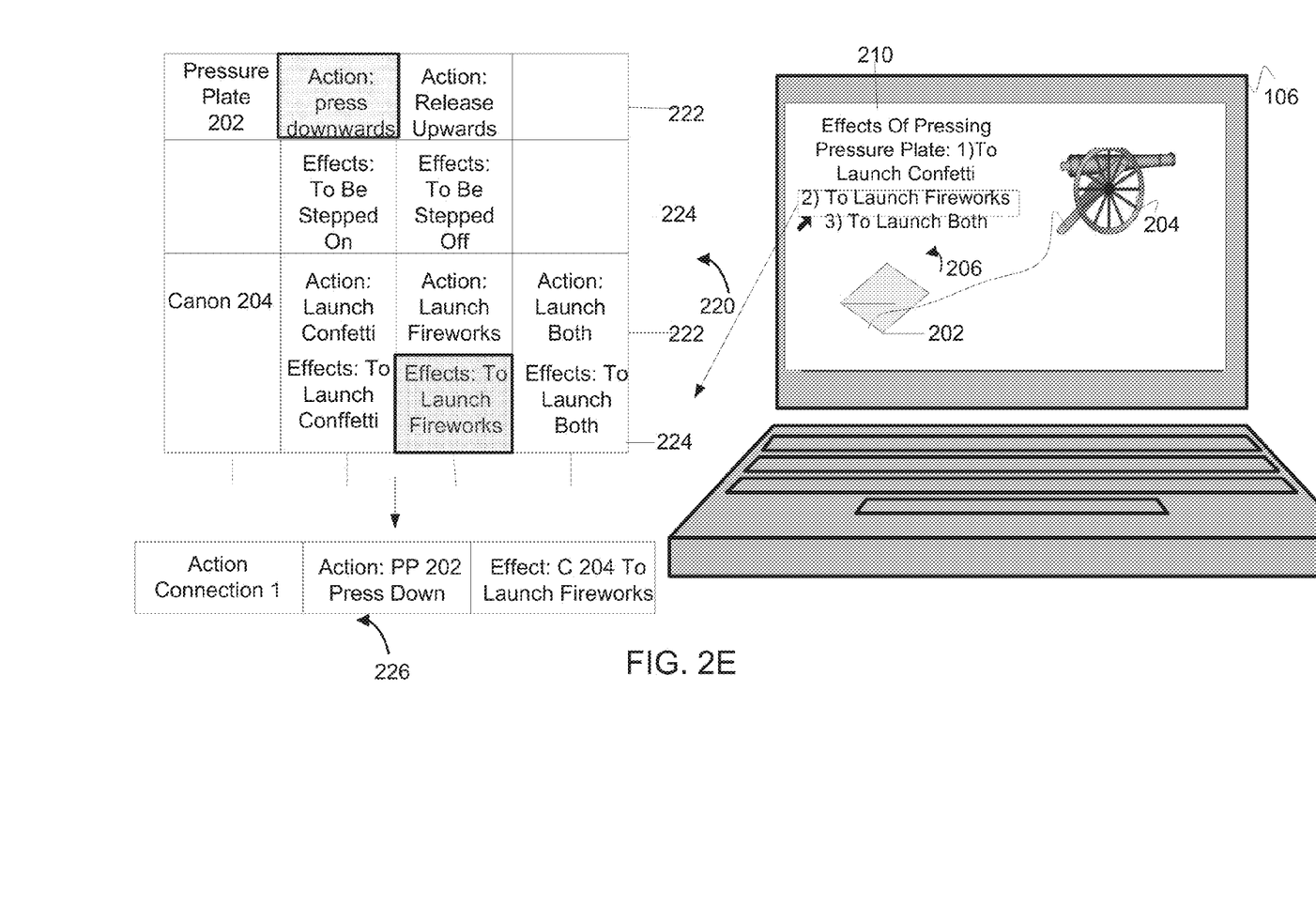
FIG. 2E illustrates an example of selecting an effect to be connected with the action selected in FIG. 2C in the action connection.

FIG. 2E illustrates the user selects "to launch fireworks" by the cannon 204 as an effect of the pressure plate 202 pressing downwards in this example. Responsive to this user selection, the connection interface module 112 sends the user selections, i.e., the pressure plate 202 pressing downward and the cannon 204 to launch fireworks to the connection module 110. As shown, responsive to receiving these user selections, the connection module 110 registers an action connection 226 providing that the pressure plate 202 pressing downward in an instance of the virtual space will produce an effect to cause the cannon 204 to launch fireworks.

Figure 2F:
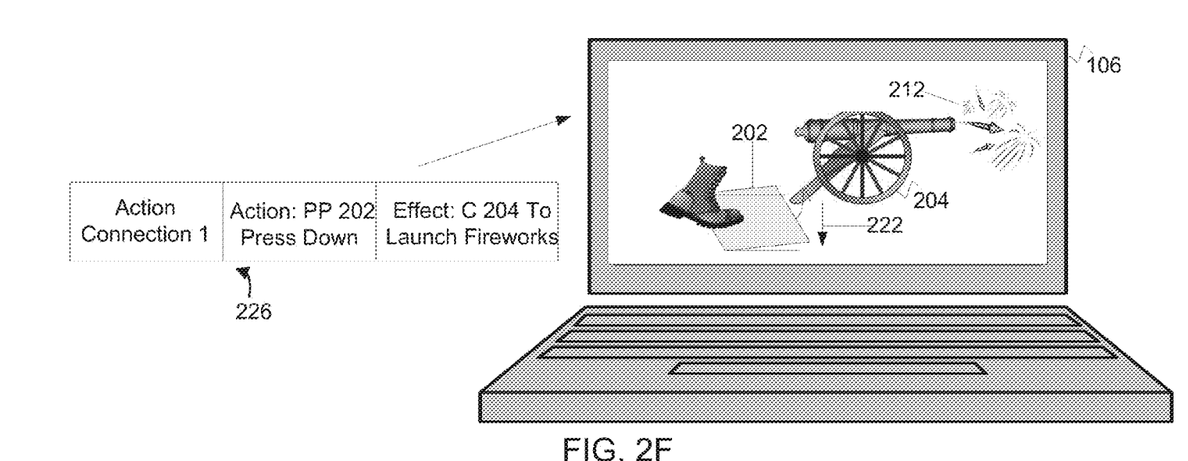
FIG. 2F illustrates an example of executing a command based on the action connection specified in FIG. 2E.

FIG. 2F illustrates at an instance of the virtual space, the pressure plate 202 is stepped on and performs a downward pressing action 222 accordingly. As shown, the effect module 114 detects the occurrence of this action in the instance of the virtual space, determines that the cannon 204 should launch fireworks as an effect of this action according to the user specified action connection 226. As a result, a command to execute this effect is generated and effectuated in the instance of the virtual space such that the cannon 204 launches the fireworks 212 in the instance of the virtual space.

Figure 2G:
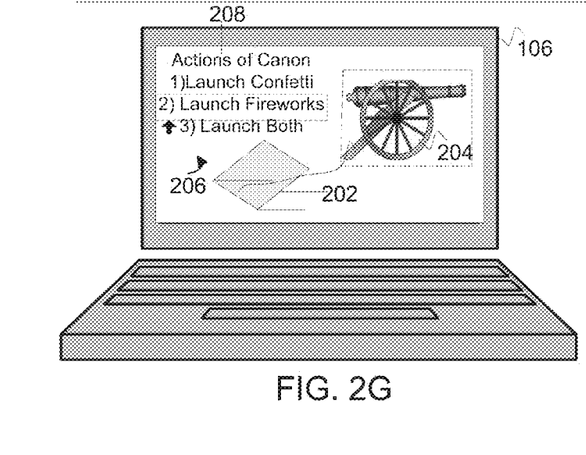
FIG. 2G illustrates yet another example of selecting a virtual space entity for specifying an action connection in accordance with the disclosure.
Figure 2H:
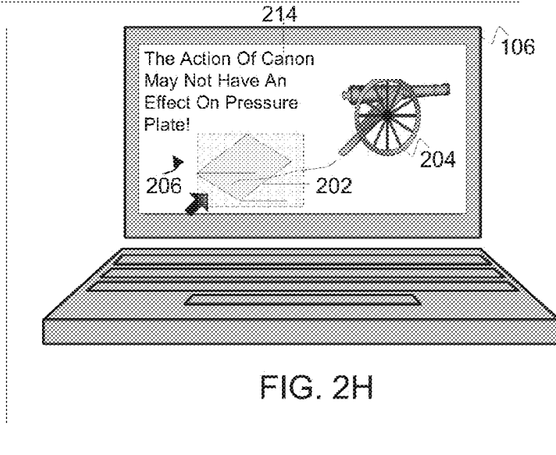
FIG. 2H illustrates an example of generating error message indicating the action connection specified in FIG. 2G may not be made.

FIGS. 2G-H illustrate an example where the connection interface module 112 determines that the user specified action connection may not take place in the virtual space. As shown in FIG. 2G, the user selects cannon 204 in the generated user interface 206 to initiate an action. As also shown, action choices are presented to the user in the user interface based on the registered information 220 regarding the cannon. In this example, the user selects the cannon to initiate fireworks launching action. FIG. 2G illustrates that the user selects the pressure plate 202 as the effect produced by the firework launching action selected by the user. As described above, responsive to these user selections, the connection interface module 112 determines that the firework launching action by the cannon 204 may not have an effect, i.e. to cause the pressure plate to perform an action associated with the pressure plate 202. In this example, such a determination is made based on predetermined virtual space rules as described above. Responsive to such a determination, the connection interface module 112 further generates an error message 214 in the user interface 206 to indicate so.

Figure 3:
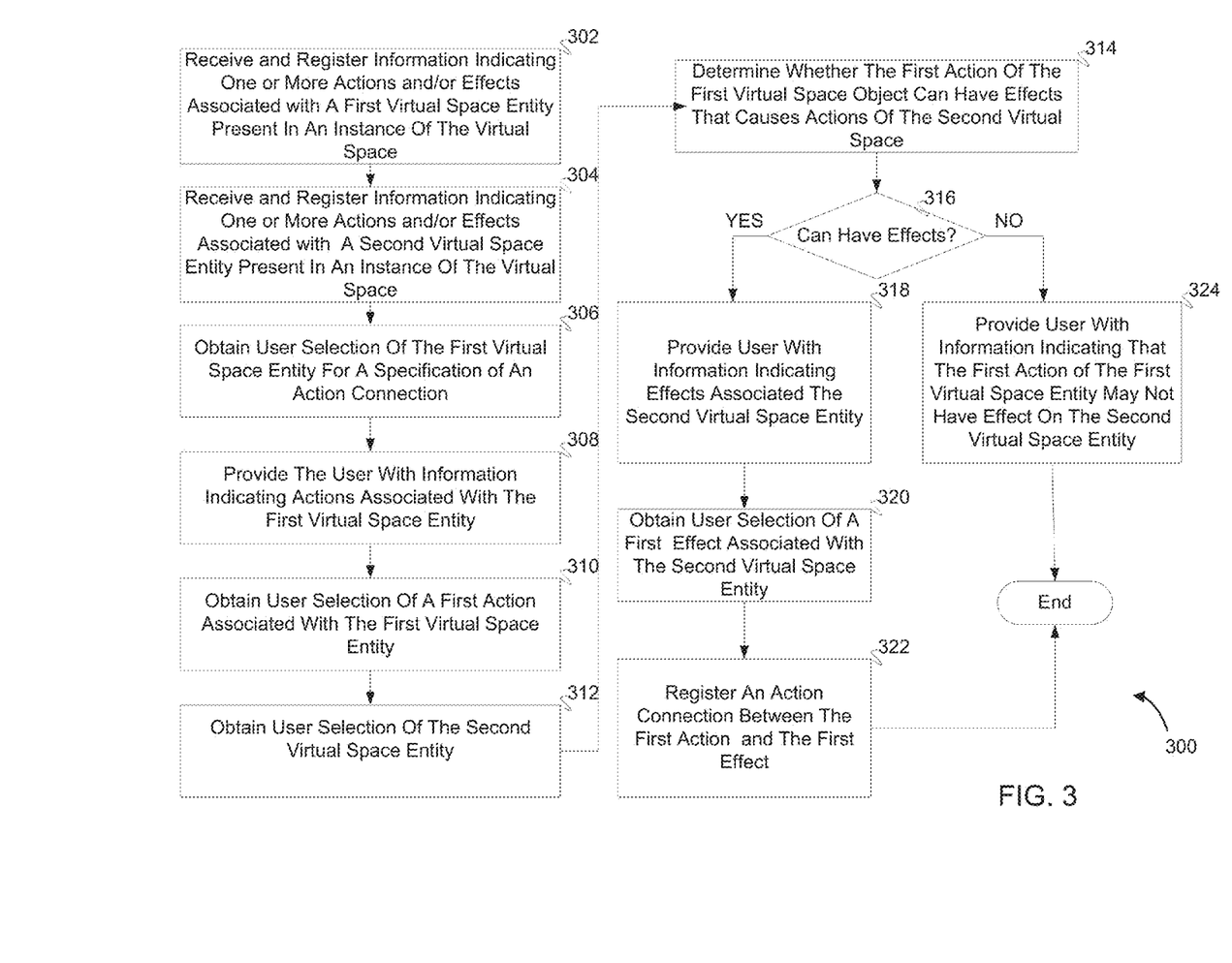
FIG. 3 illustrates an example of a method for connecting virtual space entities in accordance with one embodiment of the disclosure.

FIG. 3 illustrates an example of method 300 for connecting virtual space entities in accordance with one embodiment of the disclosure. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, information indicating one or more actions and/or effects associated with a first virtual space entity present in a given instance of the virtual space may be received and registered. An effect associated with a virtual space entity may indicate causation such that the execution of the effect may cause the virtual space entity to perform an action associated with the virtual space entity. An action associated with a virtual space entity may be programmed at a configuration stage of the system, and may be performed by the virtual space entity at a runtime of the system. In some implementations, operation 302 may be performed a virtual space entity module the same as or similar to the virtual space entity module 108 (shown in FIG. 1 and described herein).

At operation 304, information indicating one or more actions and/or effects associated with a second virtual space entity present in a given instance of the virtual space may be received and registered. In some implementations, operation 304 may be performed by a virtual space entity module the same as or similar to the virtual space entity module 108 (shown in FIG. 1 and described herein).

At operation 306, user selection of the first virtual space entity for a specification of an action connection may be obtained. In some implementations, operation 306 may be performed by connection interface module the same as or similar to the connection interface module 112 (shown in FIG. 1 and described herein).

At operation 308, information indicating actions associated with the first virtual space entity may be provided to the user in response to user selection of the first virtual space entity in operation 310. In some implementations, operation 308 may be performed by connection interface module the same as or similar to the connection interface module 112 (shown in FIG. 1 and described herein).

At operation 310, selection of a first action associated with the first virtual space entity may be obtained from the user. In some implementations, operation 310 may be performed by connection interface module the same as or similar to the connection interface module 112 (shown in FIG. 1 and described herein).

At operation 312, user selection of the second virtual space entity may be obtained. The user may select the second virtual space entity as an effect produced by the first virtual space entity. In some implementations, operation 312 may be performed connection interface module the same as or similar to the connection interface module 112 (shown in FIG. 1 and described herein).

At operation 314, whether the first action associated with the first virtual space entity can have effects on the second virtual space entity is determined. In some examples, this determination may be made based on predetermined virtual space rules. In some implementations, operation 314 may be performed by connection interface module the same as or similar to the connection interface module 112 (shown in FIG. 1 and described herein).

At operation 316, the determination of operation 314 is made. As shown in the case where it is determined that the first action associated with the first virtual space entity may not have effects on the second virtual space entity, the method 300 proceeds to operation 324; and in the case where it is determined that the first action associated with the first virtual space entity may have effects on the second virtual space entity, the method 300 proceeds to operation 318.

At operation 324, information indicating that the first action associated with the first virtual space entity may not have effects on the second virtual space entity is provided to the user. In some implementations, operation 324 may be performed by connection interface module the same as or similar to the connection interface module 112 (shown in FIG. 1 and described herein).

At operation 318, information indicating effects associated with the second virtual space entity may be provided to the user responsive to user selection of the second virtual space entity in operation 312. In some implementations, operation 318 may be performed by connection interface module the same as or similar to the connection interface module 112 (shown in FIG. 1 and described herein).

At operation 320, user selection of a first effect associated with the second virtual space entity may be obtained. The user may select the first effect to specify that the occurrence of the first action in the virtual space will produce the first effect associated with the second virtual space entity. In some implementations, operation 320 may be performed by connection interface module the same as or similar to the connection interface module 112 (shown in FIG. 1 and described herein).

At operation 322, responsive to user selection of the first effect in operation 320, an action connection between the first action and first effect may be registered. In some implementations, operation 322 may be performed by connection module the same as or similar to the connection module 110 (shown in FIG. 1 and described herein).

Figure 4:
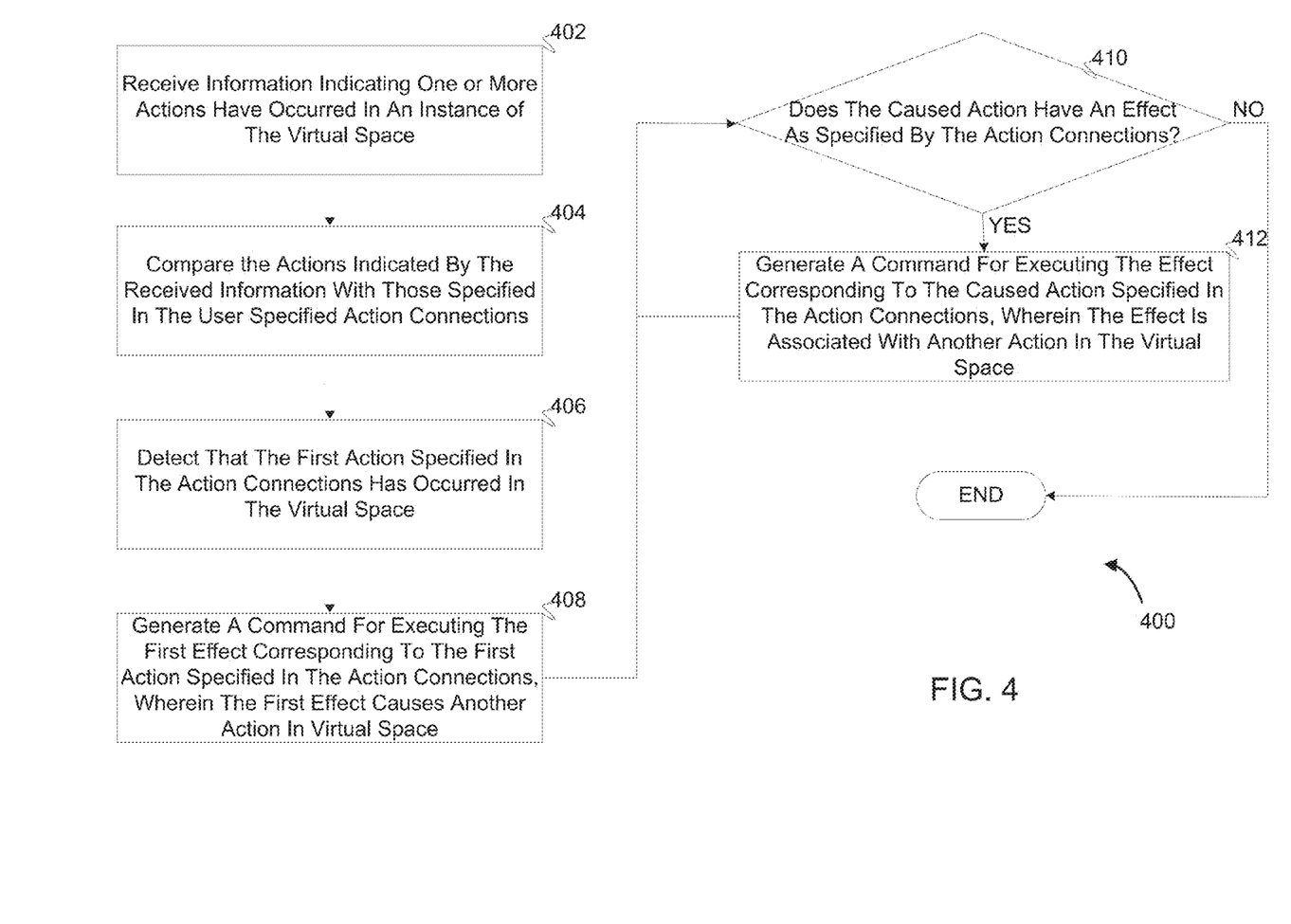
FIG. 4 illustrates another example of a method for connecting virtual space entities in accordance with one embodiment of the disclosure.

FIG. 4 illustrates an example of method 400 for connecting virtual space entities in accordance with one embodiment of the disclosure. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 3 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 402, information indicating one or more actions have occurred in an instance of the virtual space may be received. In some embodiments, such information may be received from state information provided by a virtual space server. In some implementations, operation 402 may be performed an effect module 114 the same as or similar to the effect module 114 (shown in FIG. 1 and described herein).

At operation 404, the actions indicated by the information received in operation 402 may be compared with those specified in the user specified action connections. In some implementations, operation 404 may be performed an effect module 114 the same as or similar to the effect module 114 (shown in FIG. 1 and described herein).

At operation 406, occurrence of the first action specified in the action connections may be detected based on the comparison made in operation 404. In some implementations, operation 404 may be performed an effect module 114 the same as or similar to the effect module 114 (shown in FIG. 1 and described herein).

At operation 408, a command for executing the first effect corresponding to the first action specified in the action connections may be generated. As indicated by the action connections, the first effect causes another action to be executed in the virtual space. In some implementations, operation 404 may be performed an effect module 114 the same as or similar to the effect module 114 (shown in FIG. 1 and described herein).

At operation 410, a determination whether the action caused in the operation 408 may have an effect as specified by the action connections is made. This may involving determining whether the caused action is also specified in the action connections to have an effect to cause another action. In the case where it is determined that the caused action does not have such an effect specified in the action connections, the method 400 proceed to end. In the case where it is determined that the caused action does have such an effect specified the action connections, the method proceed to operation 412.

At operation 412, a command for executing the effect corresponding to the caused action specified in the action connections is generated. The effect indicates that another action may be executed as a result of the occurrence of the caused action. Subsequently, the method 400 repeats operation 410 and 412 until there is no more effect to be executed responsive to the action caused the operation 412.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to connect entities present in an instance of a virtual space, the system comprising:
one or more physical processors configured by machine-readable instructions to:
register information regarding individual virtual space entities present in the instance of the virtual space, the virtual space comprising a simulated space having a topography, the topography describing a surface that runs through at least a substantial portion of the virtual space, the topography including surface features of the surface, the virtual space including virtual space entities positioned within the topography that are capable of locomotion within the topography, the virtual space expressing ongoing real-time interaction by users of the virtual space, the registered information indicating actions and/or effects for the individual virtual space entities, the registered information including:
information indicating a first action associated with a first virtual space entity, the first action being an action performed on the first virtual space entity by a second virtual space entity, the second virtual space entity being associated with a user of the virtual space;
information indicating a first effect associated with a third virtual space entity; and
wherein the first virtual space entity and third virtual space entity are not associated with the user;
obtain user specified action connections between virtual space entities and register the user specified action connections, the obtained action connections specifying causal relationships between actions and effects, wherein the obtained action connections include a first action connection between the first action and the first effect;
receive information indicating one or more actions that have occurred in the virtual space;
detect occurrences of actions specified in action connections in the virtual space by comparing the actions indicated by the received information with the actions specified in the user specified action connections; and
generate commands for effects to be executed in the virtual space, such that responsive to a detection that the first action has been performed on the first virtual space entity by the second virtual space entity within the virtual space, generate a command for the first effect by the third virtual space entity to be executed in the virtual space.

2. The system of claim 1, wherein the one or more physical processors are further configured by machine-readable instructions to generate user interfaces that facilitate the users to specify action connections, the generated user interfaces including a first interface for the user to connect the first action and the first effect.

3. The system of claim 1, wherein the one or more physical processors are further configured by machine-readable instructions such that the first interface is generated based on user selection of the first virtual space entity.

4. The system of claim 3, wherein the one or more physical processors are further configured by machine-readable instructions to determine that the first action can be connected with the first effect to form a causal relationship in the virtual space.

5. The system of claim 4, wherein the one or more physical processors are further configured by machine-readable instructions such that the determination that the first action can be connected with the first effect to form a causal relationship in the virtual space is made based on predetermined virtual space rules.

6. The system of claim 4, wherein the one or more physical processors are further configured by machine-readable instructions to, responsive to user selection of the first virtual space entity and to the determination that the first action can be connected with the first effect, generate information in the first interface indicating that the first action may be connected with the first effect.

7. The system of claim 1, wherein the one or more physical processors are further configured by machine-readable instructions such that the registered information includes information indicating a second effect associated with the third virtual space entity, and wherein the one or more physical processors are further configured by machine-readable instructions to determine that the first action may not be connected with the second effect.

8. The system of claim of 7, wherein the registered information includes a second action associated with the second virtual space entity, and wherein the one or more physical processors are further configured by machine-readable instructions to:
obtain a second action connection between the second action and the second effect; and
responsive to a determination that the second action has occurred in the virtual space, generate a command for the second effect by the third virtual space entity to be executed in the virtual space.

9. The system of claim of 1, wherein the one or more physical processors are further configured by machine-readable instructions to effectuate transmission of the generated commands for effects to be executed in the virtual space.

10. The system of claim 1, wherein the one or more physical processors are further configured by machine-readable instructions to recursively determine execution of actions caused by effects specified in the action connections and produce effects that cause other actions to be executed in the virtual space as specified by the action connections.

11. The system of claim 1, wherein the virtual space includes a video game taking place in the virtual space, and wherein individual virtual space entities comprise individual game entities.

12. A method for connecting entities present in an instance of a virtual space, the method being implemented in a computer system comprising one or more physical processors and storage media storing machine-readable instructions, the method comprising:
- registering information regarding individual virtual space entities present in the instance of the virtual space, the virtual space comprising a simulated space having a topography, the topography describing a surface that runs through at least a substantial portion of the virtual space, the topography including surface features of the surface, the virtual space including virtual space entities positioned within the topography that are capable of locomotion within the topography, the virtual space expressing ongoing real-time interaction by users of the virtual space, the registered information indicating actions and/or effects for the individual entities, the registered information including:
  - information indicating a first action associated with a first virtual space entity, the first action being an action performed on the first virtual space entity by a second virtual space entity, the second virtual space entity being associated with a user of the virtual space; and
  - information indicating a first effect associated with a third virtual space entity; and
  - wherein the first virtual space entity and third virtual space entity are not associated with the user;
- obtaining user specified action connections between virtual space entities and to registering the user specified action connections, the obtained action connections specifying causal relationships between actions and effects, wherein the obtained action connections include a first action connection between the first action and the first effect; and,
- receiving information indicating one or more actions that have occurred in the virtual space;
- detecting occurrences of actions specified in action connections in the virtual space by comparing the actions indicated by the received information with the actions specified in the user specified action connections; and
- generating commands for effects to be executed in the virtual space, such that responsive to a detection that the first action has been performed on the first virtual space entity by the second virtual space entity within the virtual space, generating a command for the first effect by the third virtual space entity to be executed in the virtual space.

13. The method of claim 12, further comprising generating user interfaces that facilitate the users to specify action connections, the generated user interfaces including a first interface for the user to connect the first action and the first effect.

14. The method of claim 13, wherein the first interface is generated based on user selection of the first virtual space entity.

15. The method of claim 14, further comprising determining that the first action can be connected with the first effect to form a causal relationship in the virtual space.

16. The method of claim 15, wherein the determination that the first action can be connected with the first effect to form a causal relationship in the virtual space is made based on predetermined virtual space rules.

17. The method of claim 15, further comprising responsive to user selection of the first virtual space entity and to the determination that the first action can be connected with the first effect, generating information in the first interface indicating that the first action may be connected with the first effect.

18. The method of claim 13, wherein the registered information includes information indicating a second effect associated with the third virtual space entity, and the method further comprising determining that the first action may not be connected with the second effect.

19. The method of claim of 18, wherein the registered information further includes a second action associated with the second virtual space entity, and wherein the method further comprises:
- obtaining a second action connection between the second action and the second effect; and
- responsive to a determination that the second action has occurred in the virtual space, generating a command for the second effect by the third virtual space entity to be executed in the virtual space.

20. The method of claim of 12, further comprising effectuating transmission of the generated commands for effects to be executed in the virtual space.

21. The method of claim 12, further comprising recursively determining execution of actions specified in the action connections and producing effects to cause other actions to be executed in the virtual space as specified by the action connections.

22. The method of claim 12, wherein the virtual space includes a video game taking place in the virtual space, and wherein individual virtual space entities comprise individual game entities.

* * * * *